April 23, 1968 J. J. KING 3,379,980

PULSE GENERATOR OF LOW FREQUENCY PULSE TRAIN SYNCHRONOUS TO HIGH FREQUENCY CLOCK PULSE SOURCE

Filed Nov. 30, 1965

INVENTOR.
JOHN J. KING
BY H. P. Terry
ATTORNEY

United States Patent Office 3,379,980
Patented Apr. 23, 1968

3,379,980

PULSE GENERATOR OF LOW FREQUENCY PULSE TRAIN SYNCHRONOUS TO HIGH FREQUENCY CLOCK PULSE SOURCE

John J. King, Jericho, N.Y., assignor to Sperry Rand Corporation, a corporation of Delaware Filed Nov. 30, 1965, Ser. No. 510,517
3 Claims. (Cl. 328—63)

The present invention relates to a pulse generator for use in digital control systems and in digital computers. It is particularly related to a device for generating a low frequency pulse train whose pulses occur synchronously with the pulses of a high frequency clock pulse source wherein only one pulse occurs for each cycle of a low frequency reference sinusoid.

The present invention is particularly applicable for use in traffic control systems such as in traffic intersection controllers of the type shown in U.S. patent application S.N. 453,072, entitled "Traffic Intersection and Other Signal Controllers," invented by John J. King, and filed May 4, 1965.

The present invention enjoys several advantages over prior art devices in that it is specifically designed to operate from a low frequency sinusoidal power source. Further, it employs a noncritical low duty cycle clock pulse source that affords stability and low power consumption. In addition, it is considerably less complex than prior art devices.

It is a primary object of the present invention to provide a relatively simple pulse generator.

It is a further object of the present invention to provide a pulse generator adapted to operate from a low frequency sinusoidal power source having stability and low power consumption.

In the present invention a high frequency three-phase clock source is combined with a sixty cycle power input to generate a sixty pulse per second pulse train whose pulses occur simultaneously with the pulses of one phase of the clock source. The derived sixty pulse per second pulse train may then be used for low frequency counting purposes.

Additional objects and advantages will become apparent by referring to the specification and drawings in which.

Figure 1:
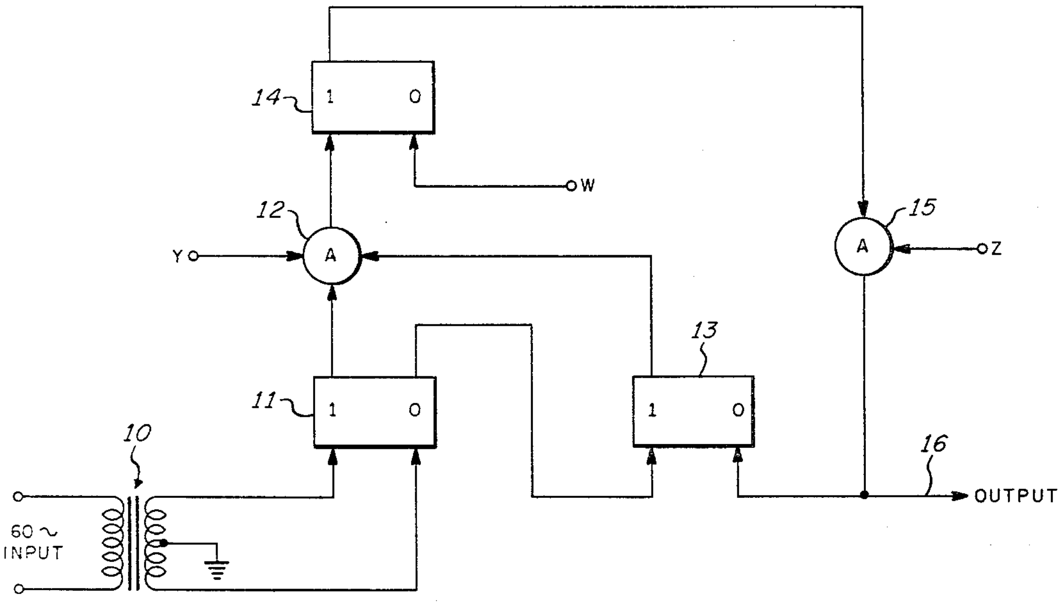
FIG. 1 is an electrical schematic diagram of the present invention.

Referring now to FIG. 1, a reference input sixty cycle sine wave as indicated by the legend is connected to the primary of a transformer 10 which has its secondary center tapped. The secondary of the transformer 10 is connected to the input terminals of a flip flop 11 in order that the positive half cycle of the sixty cycle sine wave sets the flip flop 11 to the binary one state and the negative half cycles set the flip flop 11 to the binary zero state. The flip flop 11 has its binary one state output terminal connected to an input terminal of an AND gate 12 while its binary zero output terminal is connected to a binary one state input terminal of a flip flop 13. The binary one state output terminal of the flip flop 13 is connected to another input terminal of the AND gate 12. The remaining input terminal of the AND gate 12 is responsive to the Y phase pulses of a high frequency three-phase clock source. The output terminal of the AND gate 12 is connected to the input terminal of the binary one state of a flip flop 14. The input terminal of the binary zero state of the flip flop 14 is responsive to the W phase pulses of the high frequency three-phase clock source. The output terminal of the binary one state of the flip flop 14 is connected to an input terminal of an AND gate 15 which has its other input terminal responsive to the Z phase pulses of the high frequency three-phase clock source. The output terminal of the AND gate 15 is connected to the input terminal of the binary zero state of the flip flop 13 and also to an output connection 16.

Figure 2:
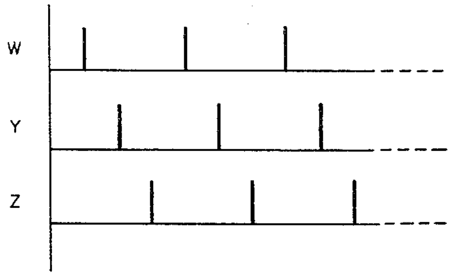
FIG. 2 is a graph showing the relationship of the pulses of the high frequency three-phase clock source.

In operation, during the negative cycle of the input sixty-cycle sine wave, the flip flop 11 is in the binary zero state with the flip flop 13 held in the binary one state by the binary zero output of the flip flop 11. The flip flop 14 has previously been set to the binary zero state by previous W pulses as the W, Y and Z pulses occur sequentially in that order as shown in FIG. 2.

When the positive portion of the input sixty cycle sine wave begins, the flip flop 11 is set to the binary one state. The output of the binary one state of the flip flop 11 provides an input to the AND gate 12. Another input is provided to the AND gate 12 by the binary one side of flip-flop 13 previously energized as stated above by the negative half cycle of the sixty cycle input. With inputs appearing on both of the other input terminals of the AND gate 12, the first Y pulse appearing after the flip flop 11 has been set to its binary one state passes through the AND gate 12 and sets the flip flop 14 to its binary one state. The binary output of the flip flop 14 enables the AND gate 15 and the subsequent Z pulse appearing on the other input terminal of the AND gate 15 passes through it to provide an output at the connection 16. The output of the AND gate 15 also resets the flip flop 13 to its binary zero state thereby disabling the AND gate 12.

The next W pulse resets the flip flop 14 to its binary zero state. Because the flip flop 13 has been reset to its binary zero state by the output of the AND gate 15, subsequent Y pulses cannot pass through the AND gate 12 until both the flip flops 11 and 13 have been set to their respective binary one states. Since the flip flop 13 is set to its binary one state by the negative half cycle of the sixty cycle input, this condition cannot occur, i.e., the flip flops 11 and 13 cannot be in their respective binary one states, until the beginning of the next positive half cycle of the sixty-cycle input thereby precluding any other pulses except the desired Z pulse from being present at the output per cycle of the sixty-cycle input. Thus, the circuit is now waiting for the next positive excursion of the sixty-cycle input upon which occurrence the next pulse of the sixty-cycle pulse per second pulse train will be generated at the output connection 16.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. A pulse generator comprising (1) first flip flop means having first and second input terminals adapted to be responsive to a low frequency reference sinusoid signal for providing binary one and zero signals at first and second output terminals respectively in accordance with positive and negative excursions of said reference sinusoid signal;

(2) second flip flop means having a first input terminal connected to said second output terminal of said first flip flop, a second input terminal, and an output terminal for providing a binary one signal;

(3) AND gate means having a first input terminal connected to said first output terminal of said first flip flop and another input terminal connected to said output terminal of said second flip flop and another input terminal responsive to the Y-phase of a high frequency three-phase clock source and also having an output terminal, (4) third flip flop means having a first input terminal connected to said output terminal of said AND gate and a second input terminal responsive to the W-phase of said high frequency three-phase clock source and having an output terminal for providing a binary one signal; and (5) another AND gate means having a first input terminal connected to said output terminal of said third flip flop and another input terminal responsive to the Z-phase of said high frequency three-phase clock source and having an output terminal connected to said second input terminal of said second flip flop and also adapted to provide an output signal for each cycle of said low frequency reference sinusoid signal.

2. A pulse generator of the character recited in claim 1 in which said W, Y and Z phases provide high frequency pulses sequentially in that order.

3. A pulse generator of the character recited in claim 1 further including a transformer having its primary winding connected to be responsive to said low frequency reference sinusoid signal and its center topped secondary winding connected to said first and second input terminals of said first flip flop means.

No references cited.

ARTHUR GAUSS, *Primary Examiner.*

S. D. MILLER, *Assistant Examiner.*